Nov. 8, 1932.  F. J. BENTZ  1,886,782
TRUCK
Filed April 21, 1931  3 Sheets-Sheet 2
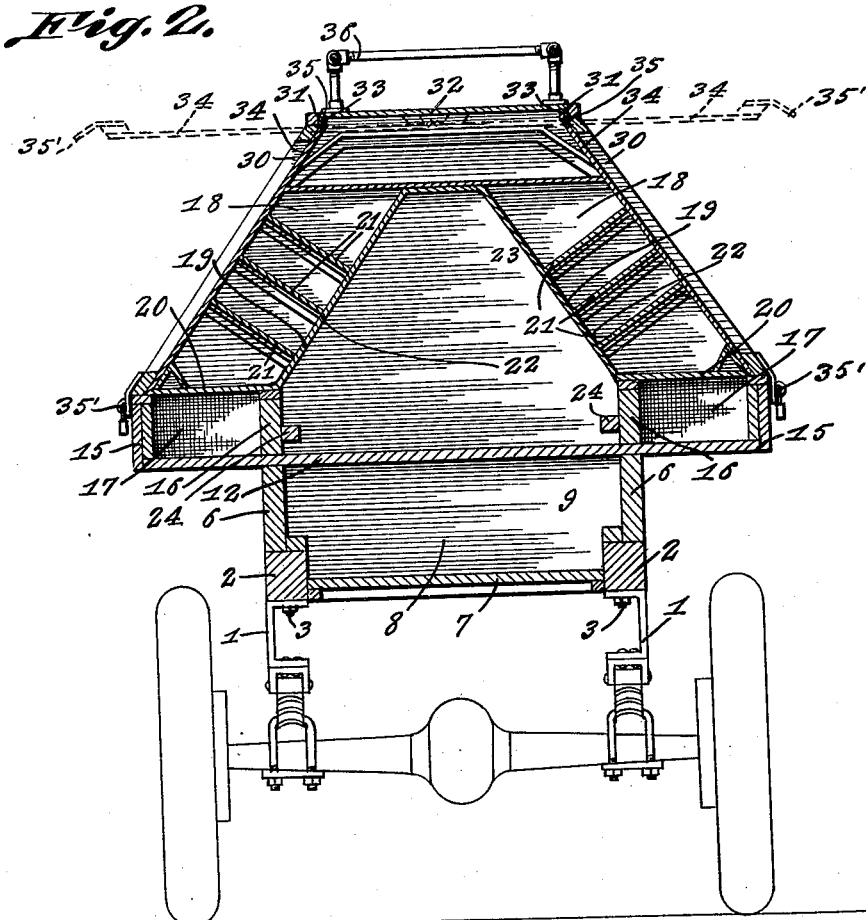
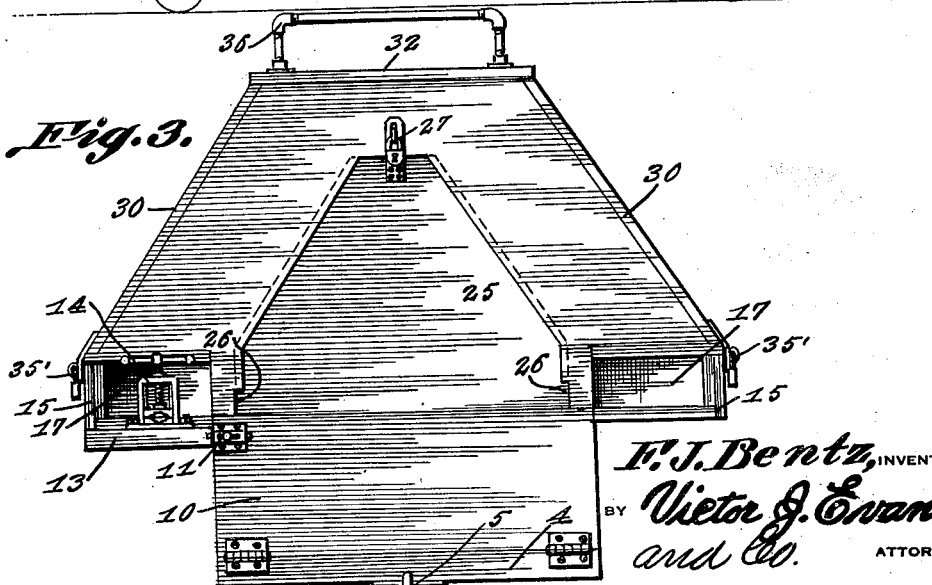
F. J. Bentz, INVENTOR
BY Victor J. Evans and Co.  ATTORNEYS Nov. 8, 1932.  F. J. BENTZ  1,886,782

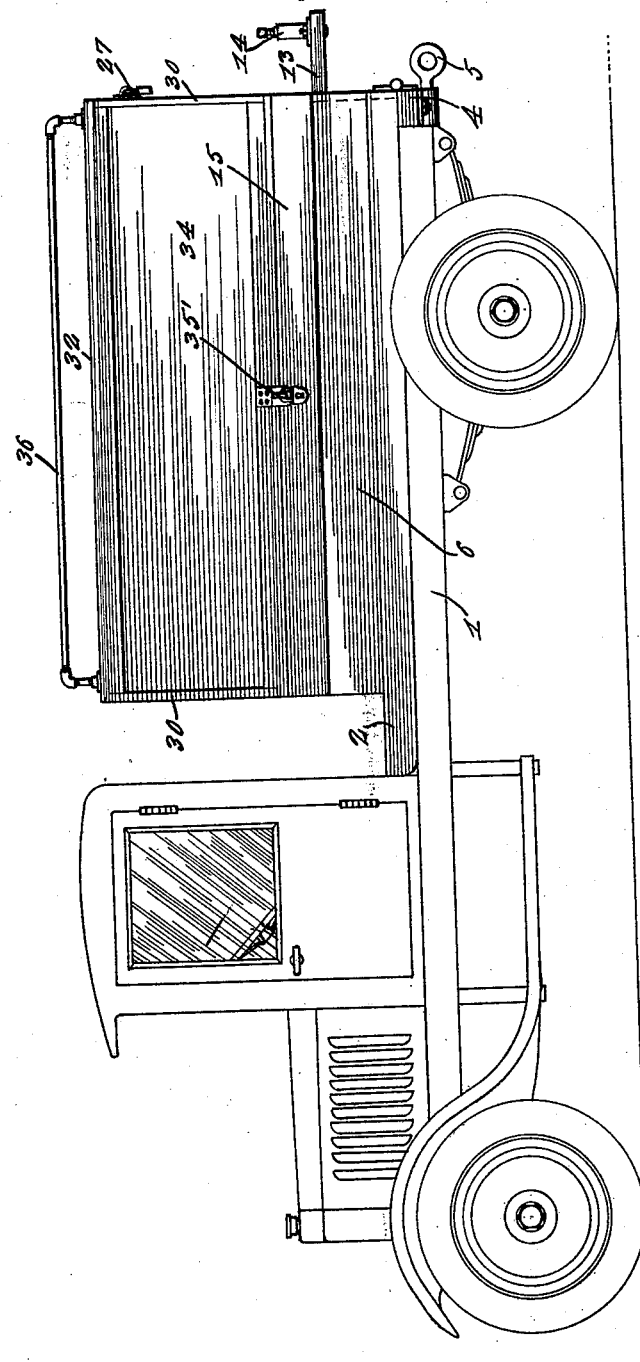

TRUCK

Filed April 21, 1931  3 Sheets-Sheet 3

F. J. Bentz, INVENTOR

BY Victor J. Evans
and Co.  ATTORNEYS

Patented Nov. 8, 1932

1,886,782

UNITED STATES PATENT OFFICE

FRANK J. BENTZ, OF MIAMI, FLORIDA

TRUCK

Application filed April 21, 1931. Serial No. 531,793.

This invention relates to a truck especially adapted to be used for carrying the supplies, material, and tools used by an artisan as for instance a plumber and consists in the novel features hereinafter described and claimed.

An object of the invention is to provide a truck body which may be used as a tool kit and storage bin for the material and also as a work bench.

With this object in view the structure includes a pair of sills adapted to be applied to the cross bar of a truck there being a compartment above the sills for the reception of material and a second compartment above the first mentioned compartment adapted to hold tools and having a door closer which may be converted into a work bench. Compartments are arranged above the last mentioned compartment and are disposed in inclined position. The last mentioned compartments have their openings disposed upwardly and outwardly so that their bottom walls are disposed downwardly and inwardly and closure panels are arranged to lie over the said openings, means being provided for holding the closure panels at elevated positions so that access may be had to the last mentioned compartments.

In the accompanying drawings:—

Figure 1 is a side elevational view of the truck.

Figure 2 is a transverse sectional view thereof.

Figure 3 is a rear end elevational view of the truck body.

Figure 4:
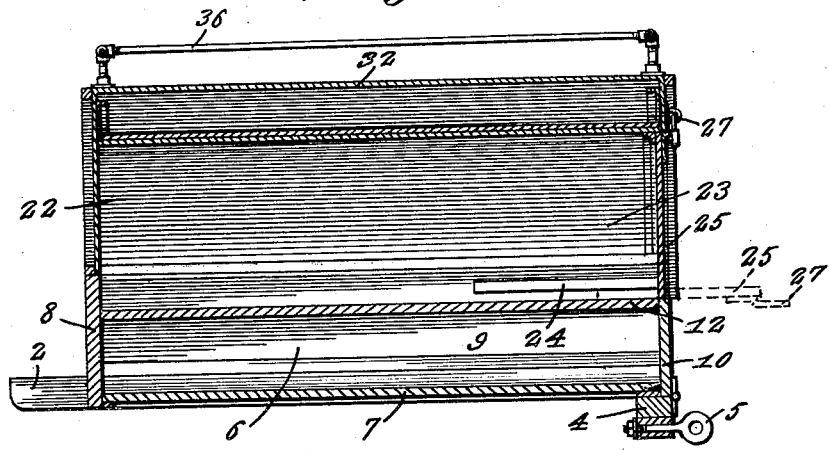
Figure 4 is a longitudinal sectional view of the truck body detached.
Figure 5:
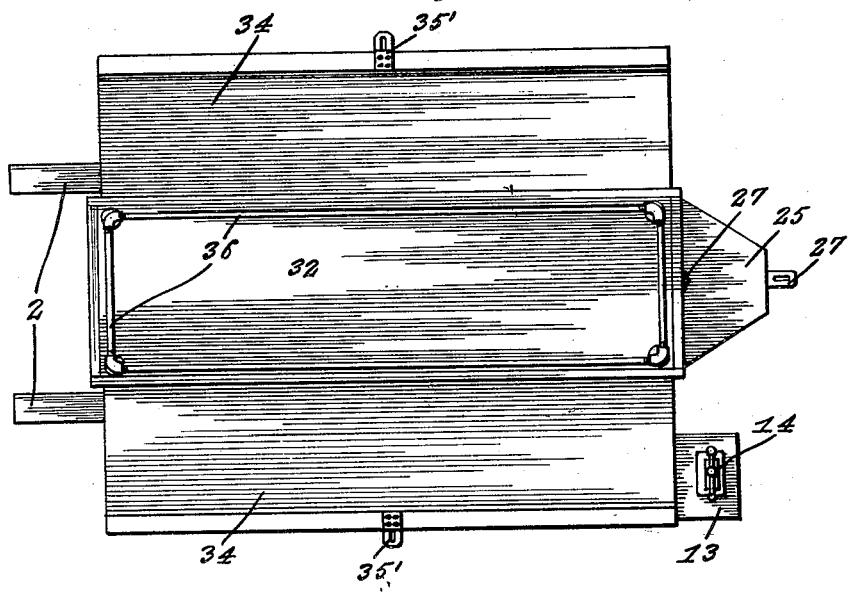
Figure 5 is a top plan view of the same.

The truck body is adapted to be mounted upon the platform 1 of a truck of conventional form as shown in Figure 1 of the drawings. The truck body comprises sills 2 which are attached to the platform 1 by means of bolts 3 (see Figure 2). A cross piece 4 is connected with the rear ends of the sills 2 and bridges the space between the sills said cross piece being located at the rear ends of the sills as best shown in Figure 1 of the drawings. A coupling member 5 is mounted upon the cross piece 4. Side pieces 6 are mounted upon the sills 2 and extend longitudinally thereof. The forward ends of the sills 2 project beyond the forward ends of the side pieces 6 but the rear ends of both the sills and the side pieces are vertically flush with each other. A bottom wall 7 is interposed between the sills 2. A front wall 8 extends across the space between the side pieces 6 at the forward ends thereof and forms a chamber 9 between the side pieces 6 and bottom wall 7 as shown in Figure 2. A door 10 is hinged to the cross piece 4 and is adapted to close the rear end of the chamber 9. A securing device 11 is mounted upon the door 10 and is adapted to hold the said door at a closed position as shown in Figure 3 of the drawings.

A floor 12 is mounted upon the upper edges of the side pieces 6 and the side portions of the floor 12 project beyond the outer surfaces of the side pieces 6 as shown in Figure 2. A shelf 13 extends rearwardly from the floor 12 in the vicinity of one side edge thereof and a vise 14 may be mounted upon the said shelf.

Side walls 15 are mounted upon the longitudinal side edges of the floor 12 and partition walls 16 are mounted upon the floor 12 vertically above the side pieces 6 the spaces between the side walls 15 and partition walls 16 form tunnels 17 which may be used for carrying long lengths of pipe, pieces of timber or other lengthy material. The tunnels 17 are open from end to end.

A bin 18 is mounted upon the upper edges of the side walls 15 and the partition walls 16 and the bin includes a pair of inclined columns 19. The bottom walls 20 of the columns 19 form the top walls of the tunnels 17. The columns 19 are anticlined as shown in Figure 2 of the drawings and each column is provided with a series of partition walls 21, the said partition walls being disposed at right angle to the inner walls 22 of the respective columns. The walls 22 form the top walls of a chamber 23 which is located above the floor 12 between the partition walls 16 herein before described. The front end of the chamber 23 is closed by the front wall of the bin. Cleats 24 are mounted upon the inner surfaces of the partition walls 16 and disposed along lines spaced above the upper surface of the floor 12.

A closure panel 25 is provided at its edges with lugs 26 which are adapted to engage under the cleats 24 and the panel 25 is adapted to serve as a closure for the rear end of the compartment 23. The panel 25 is provided with a securing device 27 whereby the said panel may be held in an upright and closed position at the rear end of the compartment 23 as indicated in Figure 3 of the drawings. The compartment 23 is designed to hold the tools which are used by the artisan. When the panel or closure 25 is swung to an open position the lugs 26 may be slid back under the cleats 24 and thus the closure 25 may serve as a work bench as indicated in dotted lines in Figure 4 of the drawings.

Frame members 30 are mounted at the inner sides of the upper portions of the front and rear walls of the bin and the said frame members are provided with shoulders 31. A plate 32 extends from the front to the rear wall of the bin and is located above the frame members 30 and spaced therefrom. Said plate is provided at its longitudinal edges with down turned flanges 33. Closure panels 34 are provided at their edges with angular disposed portions 35 adapted to engage the flanges 33 when the said panels 34 are closed down upon the outer edges of the partitions 21 as shown in Figure 2 of the drawings. The said panels 34 are provided at their lower edges with securing devices 35′ by means of which the said panels may be connected with the side walls 15 when the compartments between the partitions 21 are closed. The said compartments are designed to hold material such as the pipe elbows, small fittings, nuts bolts and the like. A railing 36 is mounted upon the plate 32 and may serve as means for holding bundles or packages upon the plate 32. When it is desired to open the compartment between the partitions 21 the panels 34 are swung upwardly upon the ends of the frames 30 and turned upon the shoulders 31 of the said frames and slid inwardly to the positions as shown in Figure 2 of the drawings when the said panels will remain in open position and free access to the contents of the compartment at the opposite side of the bin may be had by the artisan.

Having described the invention what is claimed is:—

A truck body comprising, vertical end walls, partition walls located between the end walls, and forming compartments, said compartments being arranged in inclined tiers and being open at their outer ends, a top plate disposed upon the end walls and located above the compartments and provided at its edges with downwardly disposed flanges, closure panels adapted to lie over the outer ends of the compartments and provided at their upper edges with angularly disposed portions adapted to engage behind said flanges, said panels being adapted to swing away from the compartments and slide under the top plate.

In testimony whereof I affix my signature.

FRANK J. BENTZ.